Figure 3:
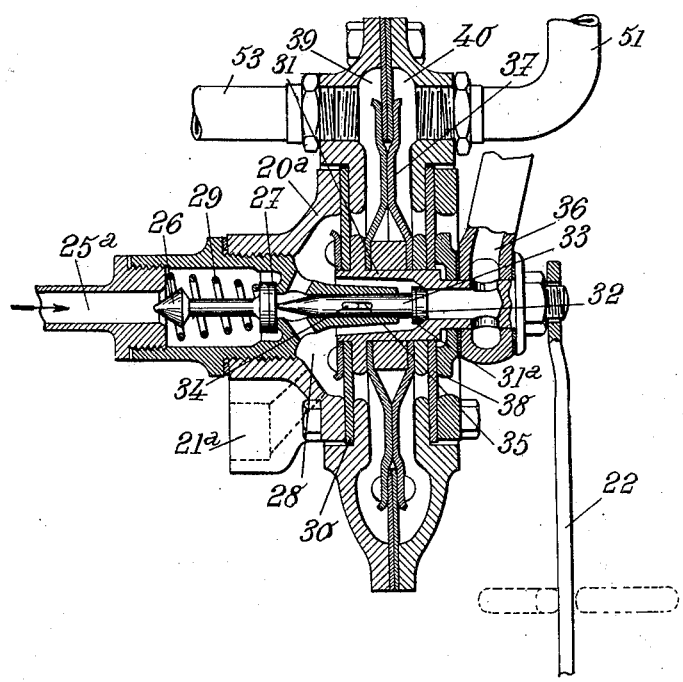

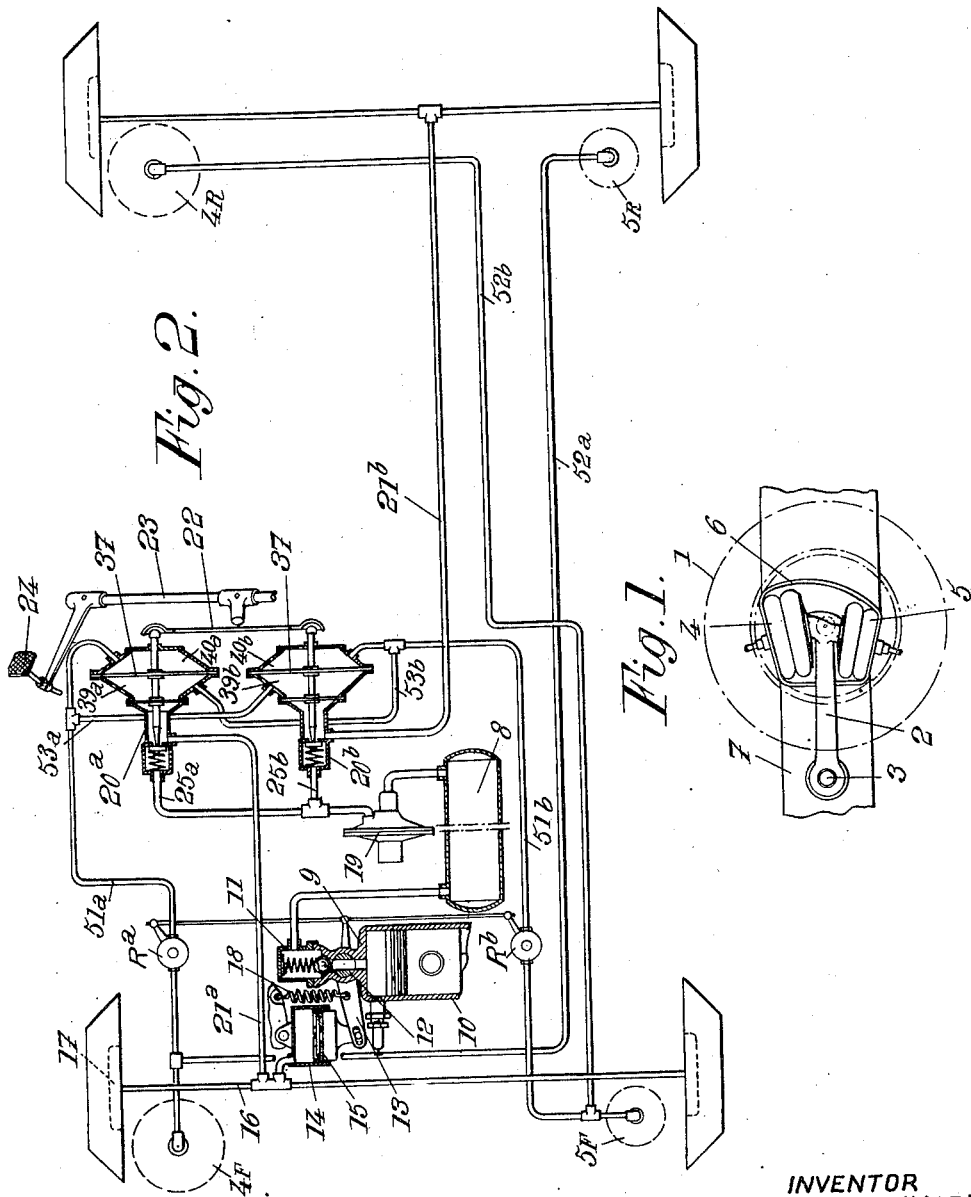

Jan. 16, 1951  R. L. JEAN-BAPTISTE SANMORI  2,538,274
FLUID BRAKE SYSTEM FOR VEHICLES

Filed Jan. 12, 1946  2 Sheets-Sheet 2

INVENTOR
ROGER LAURENT JEAN-BAPTISTE SANMORI
BY Mock + Blum
ATTORNEY

Patented Jan. 16, 1951

2,538,274

UNITED STATES PATENT OFFICE 2,538,274

FLUID BRAKE SYSTEM FOR VEHICLES

Roger Laurent Jean-Baptiste Sanmori, Monaco, Monaco

Application January 12, 1946, Serial No. 640,809
In France August 30, 1945

6 Claims. (Cl. 188—152)

The present invention relates to vehicle wheel brakes and in particular automobile (and especially touring car) wheel brakes.

Its object is to provide a braking system which is better adapted to meet the requirements of practice than those used for the same purpose up to the present time.

Preferred embodiments of the present invention will be hereinafter described with reference to the accompanying drawings, given merely by way of example and in which:

Fig. 1 diagrammatically shows a suspension system, used, by way of example, on a car fitted with brakes controlled according to the present invention;

Fig. 2 is a diagram illustrating the brake control system in question;

Finally, Fig. 3 shows, on a larger scale and in axial section, the general lay-out of said control system.

It is known that the efficiency of braking of a car depends not only upon the braking effort applied to the friction surfaces of the brakes, but also upon the adhesion of the respective wheels on the ground. Now this adhesion is a function, among other things, of the variations of load exerted on the front and rear wheel sets, whether these variations are static (that is to say due to modifications in the distribution of the loads carried by the car) or dynamic (that is to say due to variations in the car acceleration).

It is therefore important to control the braking effort on each wheel accordance with the variations of load exerted on the axles, but in the various systems suggested up to this time this control was exerted, either on the whole of the wheel sets by means of a dynamometric system responsive only to variations of the static load, or differentially on the front and rear wheel sets through a pendular system responsive only to the variations of the dynamic load.

According to the embodiment illustrated by the drawings, the suspension system of the car is of the type described in my co-pending application Ser. No. 640,807, filed January 12, 1946, Patent No. 2,443,433, June 15, 1948, that is to say includes, for each of the wheels 1, supported by a longitudinal lever 2 oscillating about an axis 3, a bearing cushion 4 and a counter-cushion 5, said cushions being respectively applied against the ends of a box 6 rigid with the frame 7 of the car. Preferably this pneumatic device is arranged in such manner as elastically to keep lever 2 in a substantially horizontal position of equilibrium. Every bearing cushion is in communication with the counter cushion of the diagonally opposed wheel.

According to my invention, as applied in connection with a suspension system of this kind, I proceed as follows:

I provide an air compressor adapted automatically to feed compressed air to a reservoir 8 every time a braking operation takes place, so as to compensate for the consumption of compressed air involved by this operation. Such a compressor can be constituted either by an automatically started independent auxiliary machine or, as shown by Fig. 2, by the car engine itself, for instance by fitting the end 9 of one of the cylinders of this engine 10 with an outwardly opening check valve 11 leading to reservoir 8. Communication between cylinder 9 and valve 11 is controlled by a cock 12, operated by a lever 13 actuated by a piston 15 mounted in a cylinder 14 in communication with the pipe 16 through which compressed air is fed to the brakes 17 of one of the wheel sets. Thus the feed of compressed air to said pipe causes, at the same time as the application of the brakes, the opening of cock 12 which tends constantly to be brought into closed position by a return spring 18.

Reservoir 8 is then connected, preferably through a pressure relief device 19 adapted to supply fluid at suitable pressure for braking purposes, with a servo-control system constituted by two distributing valve devices or relays 20a and 20b connected, respectively through conduits 21a and 21b, with the feed conduits of the front and rear brakes.

Valve devices 20a and 20b are controlled by an equalizing system, preferably constituted by an elastic bar 22, acted upon at its middle point by a lever 23 itself adapted to be actuated by a pedal 24 located close to the driver's foot.

The system for controlling distributing valve devices 20a and 20b further includes control means for differentially modifying the action of bar 22 on said valve devices, respectively. These differential means are so arranged that the compressed air pressure supplied by valve device 20a (corresponding to the front wheels) is increased and that supplied by valve devices 20b (corresponding to the rear wheels) decreased when the ratio of the front and rear suspension pressures becomes higher than the chosen value, while the contrary takes place when said ratio drops below this value For this purpose, each distributing valve device may for instance be constituted as shown by Fig 3.

Between feed conduit 25a and the outlet conduit 21a corresponding to the distributing valve device that is being considered, a double valve is interposed, including an element 26 adapted to control the outlet of conduit 25a, and another element 27 adapted to control the feed of a chamber 28 in communication with conduit 21a. A return spring 29 urges this double valve toward a position in which element 26 is out of contact with its seat and element 27 prevents any communication between conduit 25a and chamber 28.

A wall of said chamber 28 is constituted by a movable element such as an elastic annular diaphragm 30 fixed at its periphery to the casing of the valve device and connected at its inner edge to a slidable hollow part 31 forming a seat 31a for a discharge valve 32 the rod 33 of which bears against element 27 and can, owing for instance to a mounting including a pin 34 and an eye 35, have sliding displacements of limited amplitude with reference to said casing. Said valve 32 permits, when open, of connecting chamber 28 with discharge conduit 36, which participates in the sliding displacements of part 31 and leads, for instance, to the exhaust pipe of the engine.

Sliding piece 31, which serves to transmit the thrust of control rod 22 to double valve 26, 27, cooperates with differential control means constituted by an annular diaphragm 37 forming a partition between two fluid-tight chambers 39 and 40 the end walls of which are formed by diaphragm 30 and a similarly mounted diaphragm 38. Diaphragm 37 is fixed, at its periphery, to the casing of the apparatus and, at its inner edge, to sliding piece 31. Chamber 40a is connected through a pipe 51a with the bearing cushion 4F of one of the front wheels and chamber 39a is connected through pipes 53b, 51b and 52b with the bearing cushion 4R of the corresponding rear wheel. On the other hand, chamber 40b is connected through pipes 51b and 52b with the bearing cushion 4R of the same rear wheel and chamber 39b is connected through pipes 53a and 51a with the bearing cushion 4F of the first mentioned front wheel. Preferably, as shown, the bearing cushions 4F and 4R in question are located on the same side of the car, so as to make the differential control of the braking pressure free from the influence of any load differences as may occur in the transverse direction.

The diagram of Fig. 2 shows the connection 52b existing, as already indicated, between bearing cushion 4R and the diagonally opposed counter-cushion 5F. A similar connection 52a exists between bearing cushion 4F and the counter-cushion 5R of the left hand rear wheel, but is not shown by the drawing.

Preferably, double valve 26—27 is mounted in such manner that element 26 only partly closes the outlet of conduit 25a, whereby, when the brake pedal is too suddenly depressed, a certain feed of air under pressure is however allowed to pass. Anyway, spring 29 is calculated in such manner that, at the end of its deformation, its strength is greater than that of flexible bar 22.

It should be noted that it is advantageous to provide, in the feed conduits 51a and 52b of control chambers 39—40, cocks Ra and Rb automatically controlled by the means for starting compressor 8 so that said chambers are fed only during the braking operations and are at other times placed in communication with the atmosphere. In this way, the braking system is not influenced, as long as normal working conditions prevail (that is to say as long as the driver is not depressing pedal 24) by variations in the front and rear suspension pressures.

This braking system works in the following manner:

When the driver depresses pedal 24, rod 22 is acted upon by member 23 and distributes the effort exerted by the driver between the movable parts 31 of distributing valve devices 20a and 20b. In each of these two devices, said parts 31 are pushed axially toward the left, causing, through the respective valves 32, the stems of which act as push-pieces, valve elements 27 to open gradually and to admit compressed air from reservoir 8 into brake feed conduits 21a and 21b.

When the driver releases pedal 24, the part 31 of each distributing valve device is brought back toward its initial position by the action of spring 29 until valve element 27 again cuts off the communication between the feed circuit and the chamber 28 of said valve device. Then, under the effect of the fluid pressure acting on diaphragm 30, part 31 further moves in the same direction. As pin 34 limits the displacement of the stem of valve 32 in this direction, said valve opens and causes the brake conduit 21a or 21b to discharge into conduit 36, in communication with the atmosphere, whereby the brakes are released.

In the course of this operation, the braking intensity for each set of wheels depends of course upon the pressure in the corresponding brake conduit 21a or 21b, which in turn is determined by the degree of opening of the corresponding valve element 27. The displacement of this valve element results from the combined actions of bar 22 on the one hand, and the differential pressure exerted on central diaphragm 37 on the other hand. Now, in view of the above mentioned connections between, on the one hand, chambers 39 and 40, located respectively on either side of said diaphragm, and, on the other hand, the front and rear cushions of the suspension system, if the load is greater on one of the set of wheels than on the other, this differential pressure is, in one of the distributing valve devices 20a—20b, in the same direction as the push exerted by bar 22, while, in the other, it is in the opposed direction. As a consequence, valve element 27 will be opened to a higher degree in one of the distributing devices (the one corresponding to the set of wheels which is subjected to a higher load) than in the other and the braking action on said first mentioned set of wheels will be more intensive.

If the ratio of the loads on the two respective sets of wheels varies, the differential pressures on the diaphragms 37 of the distributing valve devices 20a and 20b correspondingly vary, increasing for one of them and decreasing for the other. The valve element 27 of the first one is therefore opened a little more while the element of the other is opened a little less, so that the ratio of the braking actions varies similarly to the ratio of the loads.

If the loads on the respective sets of wheels vary while their difference remains the same, the differential presures applied on diaphragms 37 remain unchanged, and the ratio of the braking actions on the two respective sets of wheels also remains unchanged.

In case of leakage in the brake circuit on the downstream side of the distributing valve devices 20a and 20b, the pressure on the left hand side of diaphragm 30 drops and this diaphragm, returning to its position of rest together with sliding part 31, causes valve element 26 to close, thus partly cutting off the compressed air source 8.

Such a braking system has many advantages among which the following may be cited:

Road holding is considerably improved, when the brakes are operated, owing to the fact that the system deals with both static and dynamic load variations on the front and rear sets of wheels. In particular, this system considerably reduces risks of head-to-tail skids, which are so frequent in the case of conventional type cars, the rear wheels of which are too intensively braked when load shifts to the front wheels due to a sudden application of the brakes.

Safety is greatly improved due to the fact that the front and rear braking circuits are independent.

Finally, when the engine is used as an air compressor, as above set forth, a supplementary braking effect is obtained.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In a vehicle including at least one front wheel set and one rear wheel set and separate pneumatic cushion suspension means for each wheel respectively, a braking system which comprises, in combination, two distinct pneumatic brake operating means, one for each wheel set, a source of pressure, a distributing valve device for each of said brake operating means, each of said devices including a casing forming a passage between said source and the corresponding brake operating means, a valve member for controlling the flow of gas under pressure from said source to said passage, a piece slidable in said casing, control means movable in said piece for operating said valve member, differential pneumatic means for controlling the relative position of said piece in said casing, said pneumatic means including two chambers connected respectively to the suspension cushions of one front wheel and one rear wheel, respectively, with inverted connections for the two distributing valve devices respectively, and an exhaust valve operative by said movable piece, and means operative by the driver for simultaneously exerting actions in a predetermined ratio, respectively, on the slidable pieces of said distributing devices.

2. In a vehicle including at least one front wheel set and one rear wheel set and separate pneumatic cushion suspension means for each wheel respectively, a braking system which comprises, in combination, two distinct pneumatic brake operating means, one for each wheel set, a source of pressure, a distributing valve device for each of said brake operating means, each of said devices including a casing forming a passage between said source and the corresponding brake operating means, a valve member for controlling the flow of gas under pressure from said source to said passage, a piece slidable in said casing, control means movable in said piece for operating said valve member, differential pneumatic means for controlling the relative position of said piece in said casing, said pneumatic means including two chambers connected respectively to the suspension cushions of one front wheel and one rear wheel, respectively, with inverted connections for the two distributing valve devices respectively, and an exhaust valve operative by said movable piece, and means operative by the driver for simultaneously exerting equal actions, respectively, on the slidable pieces of said distributing devices.

3. In an automobile vehicle including an engine, at least one front wheel set and one rear wheel set and separate pneumatic cushion suspension means for each wheel respectively, a braking system which comprises, in combination, two distinct pneumatic brake operating means, one for each wheel set, an air compressor constituted by at least one cylinder of said engine, a distributing valve device for each of said brake operating means, each of said devices including a casing forming a passage between said air compressor and the corresponding brake operating means, a valve member for controlling the flow of gas under pressure from said source to said passage, a piece slidable in said casing, control means movable in said piece for operating said valve member, differential pneumatic means for controlling the relative position of said piece in said casing, said pneumatic means including two chambers connected respectively to the suspension cushions of one front wheel and one rear wheel, respectively, with inverted connections for the two distributing valve devices respectively, and an exhaust valve operative by said movable piece, and means operative by the driver for simultaneously exerting equal actions in a predetermined ratio, respectively, on the slidable piece of each of said distributing devices.

4. In a vehicle including at least one front wheel set and one rear wheel set, and pneumatic suspension means for said wheel sets, a braking system which comprises, in combination, front and rear brake means for said wheel sets, respectively, separate means for adjustably operating each of said brake means, means operative by the vehicle driver for simultaneously exerting on said two operating means equal actions in a predetermined ratio, and means for automatically superposing to said actions on said operating means, in opposed directions respectively, the action of a force proportional to the difference between the pneumatic suspension pressures of said front and rear wheel sets respectively so as to differentiate the braking intensities on said wheel sets in favor of the more loaded one.

5. In a vehicle including at least one front wheel set and one rear wheel set, and individual pneumatice cushion suspension means for said wheel sets, a braking system which comprises, in combination, front and rear brake means for said wheel sets, respectively, separate means for adjustably operating each of said brake means, means operative by the vehicle driver for simultaneously exerting equal actions on said two oprating means, and means for automatically superposing to said actions on said operating means, in opposed directions respectively, the action of a force proportional to the difference between the cushion pressures in the suspension means of a front wheel and a rear wheel, respectively, located on the same side of the vehicle, so as to differentiate the braking intensities on said wheel sets in favor of the more loaded one.

6. In a vehicle, a braking system which comprises, in combination, front brake means and rear brake means each having braking effects variable in accordance with the energy applied thereto, a source of energy for operating said brake means, two relays interposed between said source and said front and rear brake means respectively for controlling the supply of energy from said source to said brake means, means operative by the vehicle driver for exerting adjustable control actions on both of said relays, and means differentially operative in response to variations of the total loads, both static and dynamic, respectively supported by the front and rear portions of said vehicle, for exerting correcting control actions on said respective relays in accordance with the relative values of said respective loads so as to differentiate the braking effects of said front and rear braking means in favor of those cooperating with the more loaded wheels.

ROGER LAURENT JEAN-BAPTISTE SANMORI.

REFERENCES CITED

The following references are of record in the file of this patent:

UNITED STATES PATENTS

| Number | Name | Date |
|---|---|---|
| 445,254 | Richards | Jan. 27, 1891 |
| 976,000 | Schenk | Nov. 15, 1910 |
| 2,181,161 | Wolf | Nov. 28, 1939 |
| 2,225,978 | Carmichael | Dec. 24, 1940 |